United States Patent [19]
Kutney

[11] 3,806,067
[45] Apr. 23, 1974

[54] AREA RULED NACELLE
[75] Inventor: John T. Kutney, Cincinnati, Ohio
[73] Assignee: General Electric Company, Cincinnati, Ohio
[22] Filed: Aug. 30, 1971
[21] Appl. No.: 176,103

[52] U.S. Cl............... 244/53 R, 415/79, 60/226 R, 60/200 R, 60/39.31, 123/41.7
[51] Int. Cl............................................. B64d 29/00
[58] Field of Search........... 244/53 R, 53 B, 58, 54; 60/226, 39.31, 200 R, 262; 123/41.7; 137/15.1, 15.2; 415/79

[56] References Cited
UNITED STATES PATENTS
3,528,246  9/1970  Fischer .............................. 60/226
3,583,661  6/1971  Karl et al. ..................... 137/15.1 X
3,568,694  3/1971  Johnson ............................. 137/15.1

Primary Examiner—George E. A. Halvosa
Assistant Examiner—Edward R. Kazenske
Attorney, Agent, or Firm—James M. Kipling; Derek P. Lawrence

[57] ABSTRACT

An aircraft powered by a turbofan gas turbine engine is provided with an aircraft/engine installation in which either the nacelle which surrounds the fan or the core engine nacelle is area ruled to give a flow relief in the region of the wing pylon which extends into the fan passageway. The flow relief reduces the local static pressure upstream of the pylon and thus eliminates the distortion effects on the fan thereby increasing installed thrust and also reducing interference drag. The same area rule principle is also applied to regions of the fan passageway upstream of any obstruction, such as an engine control or accessory mounted on the core engine casing.

8 Claims, 7 Drawing Figures

INVENTOR.
JOHN T. KUTNEY
BY
T.J. Bird, Jr.
AGENT

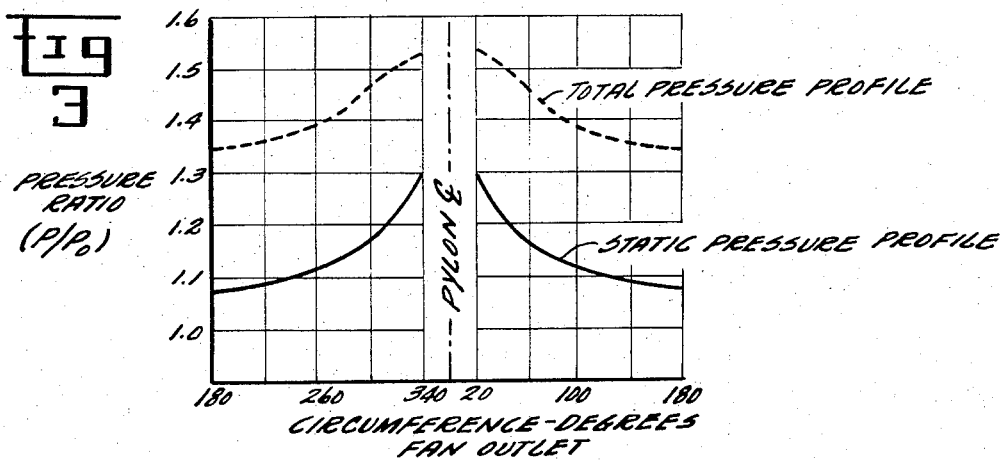
Fig. 3
Fig. 5
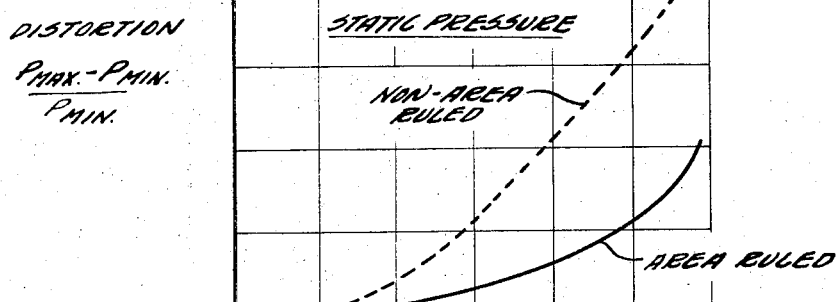
Fig. 6    Fig. 7
INVENTOR.
JOHN T. KUTNEY
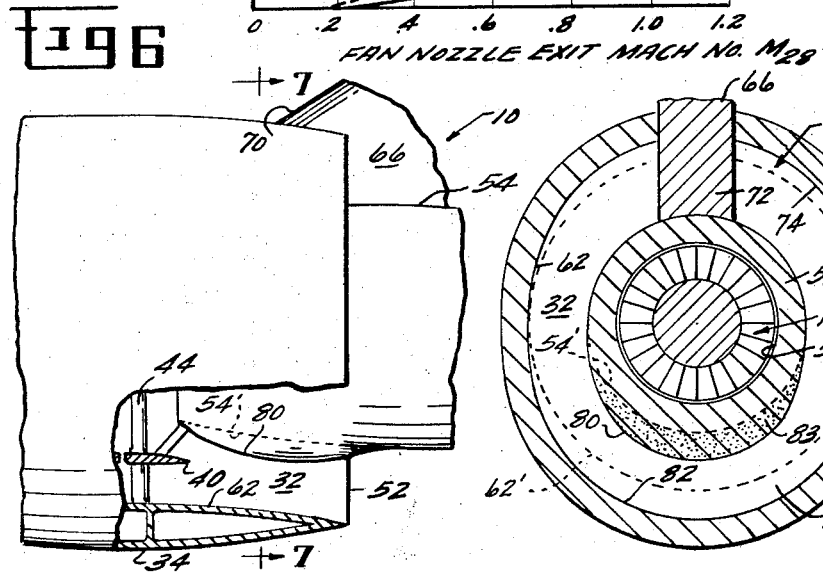

AREA RULED NACELLE

BACKGROUND OF THE INVENTION

This invention relates generally to the field of propulsion system aerodynamics and, more specifically, to an improved installation technique for front fan gas turbine engines for aircraft propulsion.

The performance of new aircraft systems is occasionally significantly poorer than predictions and guarantees. There are many possible technical and nontechnical reasons for the performance deficiencies of the aircraft system. One of the most significant and little understood phenomena is the interaction between the aircraft and its propulsion system. Installation effects on the propulsion system were shown in the past to have been significant causes of the performance losses.

One potential aircraft/engine interface problem area is concerned with the aircraft pylon and the manner in which the pylon is attached to the engine mounting system. The aircraft pylon width requirements are on the order of 16 to 26 inches for large thrust turbofan engines. The axial location of the pylon leading edge is usually very close to the fan exit. This combination of pylon location and width requirements results in very large circumferential gradients in the fan nozzle total pressure and static pressure profiles. The high static pressure in front of the pylon leading edge causes a local back pressuring of the fan. This raises the fan discharge total pressure, causing a strong one-per-rev excitation of the fan blade.

In addition to the blade vibration problem, other effects of the pylon distortion are to cause potential exhaust nozzle velocity coefficient deficiencies and to greatly complicate the flow measurement properties for calculation of nozzle thrust. This same type of distortion problem can also result from the location of aircraft accessories located near the fan exit.

In the past, the only successful method of relieving this distortion problem was the modification of th fan stator by tailoring the fan outlet duct guide vanes. That is, the fan outlet guide vanes were not all set at the same angle. Certain segments of the vanes had to be staggered with respect to adjacent vanes. The amount of tailoring of the vane angles needed could only be determined by complicated and costly testing of the installed engine.

SUMMARY OF THE INVENTION

It is an object of the present invention, therefore, to overcome the distortion problems caused by aircraft pylon interference in the fan exit plane without the necessity of tailoring or staggering fan stator blades. It is a further object of this invention to overcome similar distortion problems resulting from the location of aircraft accessories near the fan exit plane.

Briefly stated, the above and other related objects are attained by providing an aircraft/engine installation in which the nacelle surrounding the core engine portion of a turbofan engine and/or the fan nacelle is provided with flow relief areas at the pylon and any engine accessory location. The amount of flow relief required is provided by designing the nacelle to have an area-ruled geometry at the location of the pylon and also at the location of any engine accessories which might affect the fan exhaust flow.

DESCRIPTION OF THE DRAWINGS

The specification concludes with claims particularly pointing out and distinctly claiming the subject matter which applicant regards as his invention. A clear understanding of this invention may be gained, however, from the following detailed description of a preferred embodiment, given in connection with the accompanying drawings, in which:

FIG. 3 is a graphical plot of the pressure distribution at or near section 2—2;

FIG. 5 is a graphical plot showing the effects of the installation of FIG. 4;

FIG. 6 is a schematic view, with portions removed, of another use of the inventive concept; and FIG. 7 is a sectional view taken along line 7—7 of FIG. 6.

DESCRIPTION OF A PREFERRED EMBODIMENT

Figure 1:
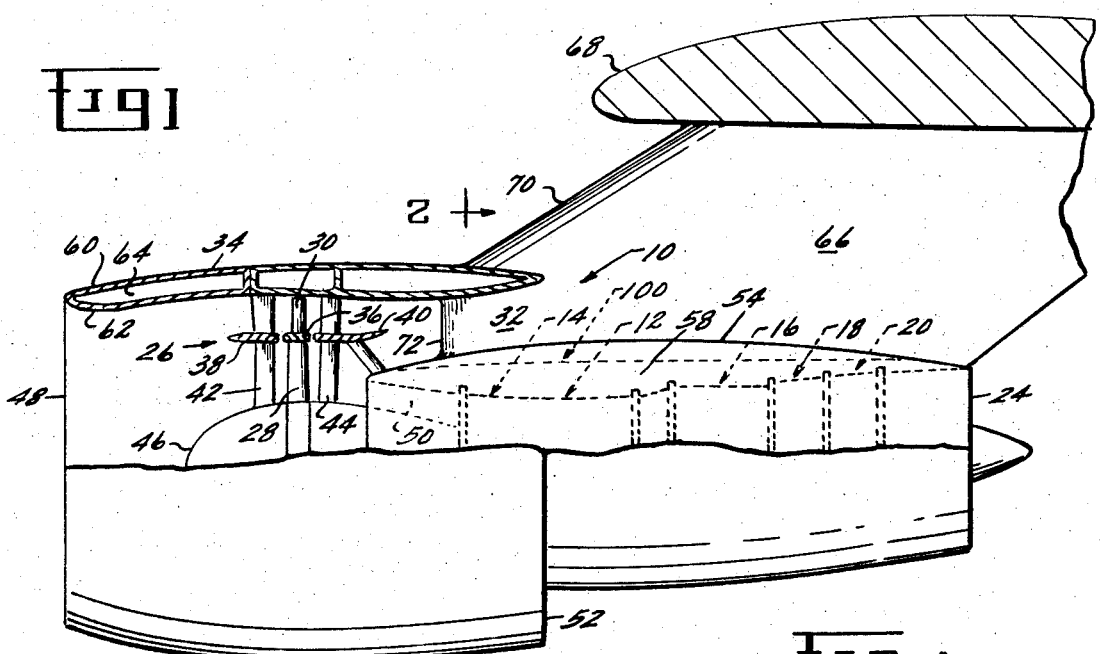
FIG. 1 is a schematic view, with portions removed, of a typical high bypass, large diameter turbofan engine.

Referring now to the drawings wherein like numerals correspond to like elements throughout, FIG. 1 shows in simplified fashion a turbofan engine 10 of the high bypass ratio type, comprising a core engine 12 which is essentially a turboshaft engine in that it includes a compressor 14, a combustor 16, a gas generator tube 18 for driving the compressor 14, and a power turbine 20 arranged in axially spaced, serial flow relationship. The inner turbomachine, or core engine 12, is enclosed within a cylindrical casing or nacelle 22 which terminates at its downstream end in an exhaust nozzle 24 through which the combustion products may be discharged to produce thrust.

In order to provide additional thrust, the fan 26 is mounted upstream of the core engine 12 and is driven by the power turbine 20. The fan 26 includes inner and outer compressor or fan blades 28 and 30, respectively, which extend radially outwardly of the nacelle 22 across a bypass duct or passageway 32 defined between an outer, cylindrical fan nacelle 34 and the core engine nacelle 22, the blades 28 and 30 being interconnected by platforms 36.

The platforms 36 are aligned with stationary shroud members 38 and 40, which are carried by a plurality of fan inlet guide vanes 42 and fan outlet guide vanes 44, respectively. The fan inlet guide vanes 42 and outlet guide vanes 44 extend radially inwardly from the fan nacelle 34 to a "bullet nose" 46, which forms the internal flow path boundary for the fan 26.

It will thus be noted that air drawn through an inlet opening 48 at the upstream end of the nacelle 44 is accelerated by the fan 26, after which a portion of the air passes through the inner blades 28 and is supplied to the core engine 12 through a passageway 50 to support combustion in the core engine. The remainder of the air flows through the bypass passageway 32 from which it is normally discharged in the axial downstream direction through an outlet opening 52.

The turbofan engine 10 is a high bypass ratio machine; by the term "high bypass ratio" it is meant that the ratio of mass flow of fluid in the bypass passageway 32 to mass flow in the inlet passageway 50 to the core engine 12 is high. Since a substantial amount of energy is extracted from the combustion gases in driving the power turbine 20, it will occur to those skilled in the art that the major portion of the total thrust provided by the gas turbine 10 is yielded by the bypass stream of air emanating from the outlet 52.

While the present invention is being described in connection with the high bypass ratio engine 10, it will become readily apparent to those skilled in the art from the following description that the inventive concepts described herein may be readily applied to any type of turbofan engine.

Referring still to FIG. 1, the core engine nacelle 22 includes an outer wall 54 and an inner wall 56 which cooperate to form an annular chamber 58 surrounding the core engine 12. The upstream end of the outer wall 54 forms the inner bounds of the fan passageway 32, while the inner wall 56 forms a casing for the core engine 12. Likewise, the fan nacelle 34 includes an outer wall 60 and an inner wall 62 which cooperate to form an annular duct 64. The upstream end of the inner wall 62 describes the inlet 48, while the downstream end of the wall 62 forms the outer bounds of the passageway 32.

Figure 2:
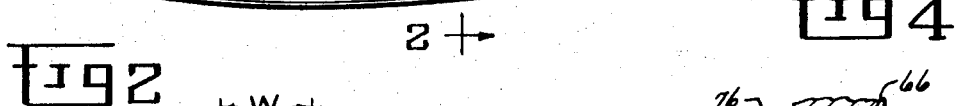
FIG. 2 is an enlarged sectional view taken along line 2—2 of FIG. 1.

As further shown in FIG. 1, a typical under-the-wing installation of the turbofan engine 10 includes a pylon 66 which extends from the engine 10 to a wing 68. The pylon 66 is shown to include a leading edge 70 which extends from the wing 68 to the outer wall 60 of the fan nacelle 34. The pylon 66 further includes a nose portion 72 positioned within the bypass passageway 32 and extending between the inner wall 62 of the fan nacelle 34 and the outer wall 54 of the core engine nacelle 22 as shown in FIG. 2. For large thrust turbofan engines, the aircraft pylon width (labeled W in FIG. 2) requirements are on the order of 16 to 26 inches.

The axial location of the nose portion 72 of the pylon 66 is very close to the fan exit as shown in FIG. 1. This combination of pylon location and width requirement results in very large circumferential gradients in the fan nozzle total pressure and static pressure profile. A typical pressure profile at the fan exit is shown in FIG. 3. A region of high static pressure exists in front of the nose portion 72 of the pylon 66 which causes a local back pressuring of the fan 26. This raises the fan discharge total pressure, causing a strong one-per-rev excitation of the fan blades. In addition to the blade vibration problem, the pylon distortion also causes potential exhaust nozzle velocity coefficient deficiencies and greatly complicates the flow measurement properties for calculation of nozzle thrust.

As previously mentioned, the only known prior successful method of relieving this distortion problem consisted of modifying the fan stator by tailoring the fan outlet guide vanes 44. That is, certain segments of, or individual, outlet guide vanes 44 were staggered with respect to adjacent vanes in order to reduce the distortion effects caused by the pylon 66. The tailoring is a rather complicated and costly procedure, however, in that the effects of staggering individual vanes can only be accurately determined by installed engine testing.

Figure 4:
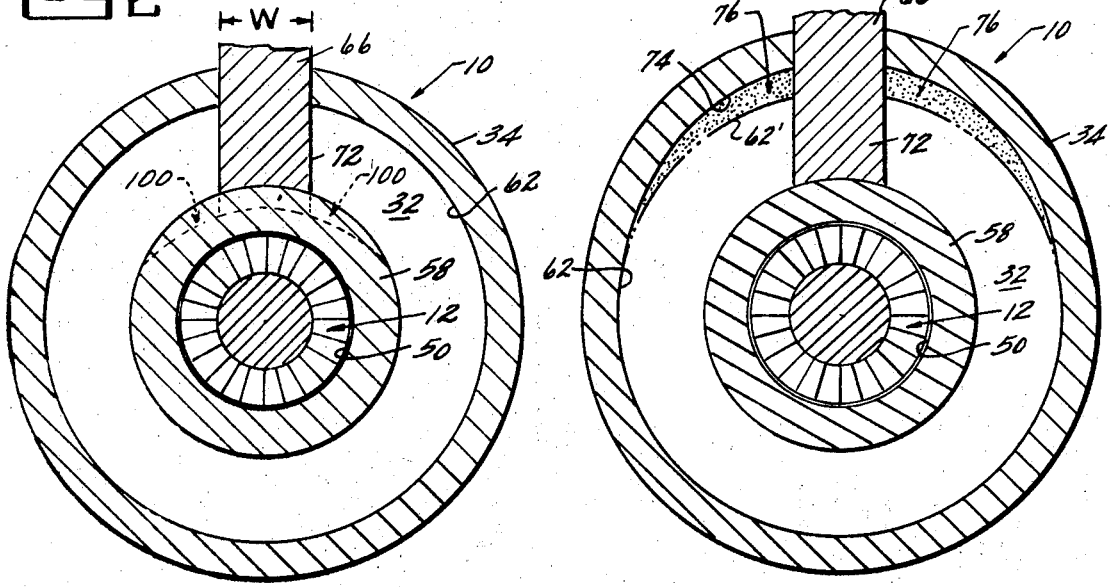
FIG. 4 is an enlarged sectional view, similar to FIG. 2, showing an installation incorporating the present invention.

With reference to FIGS. 4 and 5, a different approach to reducing this type of pylon distortion will now be discussed. This approach consists basically of designing the nacelle to have an area-ruled geometry which provides a flow relief for the pylon area. Thus, as shown in FIG. 4, the inner wall 62 of the fan nacelle 34 would be formed such that the passageway 32 has an elliptical outer diameter in the area immediately surrounding the pylon 66. The elliptical outer diameter, defined by a wall 74, results in an increased flow area 76 as shown by the dotted portion of FIG. 4 between previously used inner wall 62' and the new wall 74. This increased flow area 76 is designed to offset the blockage of the passageway 32 caused by the nose portion 72 of the pylon 66. The net result of this design is shown in FIG. 5 where the distortion characteristics are presented in terms of the local Mach number. The reduction in distortion level is apparent for both total pressure and static pressure. This reduction in distortion level results in much higher installed performance levels for the turbofan engine 10.

Referring now to FIG. 6, the same type of distortion problem is shown to result from the location of aircraft accessories near the fan exit 52. To reduce the overall size envelope of a turbofan engine, designers normally mount engine controls and accessories directly to the core engine 12 rather than to the fan 26 because the core engine 12 has a much smaller outer diameter than the fan 26. Furthermore, in order to make the controls and accessories readily accessible for servicing in under-the-wing mounting systems, the controls are normally mounted directly to the inner wall or casing 56 at or near the bottom of the core engine 12. Because of the large number and the size requirements of these controls and accessories, the outer wall 54 of the core engine nacelle 22 may quite often include a bulge or enlarged portion 80 which surrounds the controls and accessories as shown in FIG. 6. As shown in the sectional view of FIG. 7, this enlarged portion 80 can result in severe blockage of the passageway 32 at or near the exit thereof with the blocked area being shown by the dotted area 83. The distortion effects on the fan 26 caused by this blockage are similar to those described above in connection with the nose portion of the pylon, as plotted in FIG. 3. In order to reduce this distortion, the area rule principle is again applied to the inner wall 62 of the fan nacelle 34. Thus, as shown in FIG. 7, the bottom of the fan passageway 32 is provided with an elliptical outer diameter, defined by a wall 82 which provides an increase in flow area designated 84. The net effect of this flow relief would again be an increase in installed performance as described in connection with FIG. 5.

The increase in installed thrust for the turbofan engine 10 results not only from the reduction of distortion effects on the fan 26, as described above, but also from a reduction in interference drag as will be shown in connection with FIGS. 1 and 2. It is a well known fact that the local curvature effects of nacelle afterbodies, pylon and wing contours result in additive velocities within the bypass passageway 32 and around the top of the core engine nacelle 22. As is readily apparent to those skilled in the art, the additive velocities result in increased interference drag, which shows up only in installed engine tests. As shown in FIGS. 1 and 2, area ruling can be applied not only to the fan nacelle 34 but also to the core engine nacelle 22 in order to reduce this interference drag. If the core engine nacelle 22 is constructed as shown in phantom at 100 as opposed to the solid line construction 54, the less rapid curvature of the nacelle 22 near the top reduces the additive velocities which tend to occur and thus reduces the interference drag associated therewith. The reduced curvature at the top of the nacelle 22 may be accompanied by increased curvature at the bottom of the nacelle. This increased curvature at the bottom is more easily tolerated, however, because the flow field is free from wing and pylon additive contributions in this area.

As described above, the area ruled nacelle can be utilized to eliminate pylon distortion effects, to eliminate engine accessory distortion effects, and also to reduce interference drag caused by additive velocities in the pylon/wing area. Applicant has thus provided a method of significantly improving installed engine performance for any turbofan installation.

Having thus described my invention, what I claim is:

1. In a gas turbine engine of the type including a fan and a core engine for driving the fan, a fan nacelle surrounding said fan and a core engine nacelle surrounding said core engine, said fan nacelle and said core engine nacelle cooperating to form an exit passageway for said fan, and an obstruction at or near said fan exit causing a back pressure on said fan, the improvement comprising:

a nacelle provided with an area-rule geometry at or near the obstruction to yield a flow relief for the obstruction within said fan passageway to thereby substantially eliminate distortion effects on the fan caused by said obstruction; wherein said obstruction comprises a wing pylon, said pylon including a portion positioned within said fan passageway and extending between said core engine nacelle and said fan nacelle; said fan nacelle is provided with the area-rule geometry; and said fan nacelle includes an inner wall and an outer wall, said inner wall forming an outer boundary for said fan passageway and said inner wall including a first cylindrical portion and a second elliptical portion.

2. The improvement recited in claim 1 wherein said elliptical portion of said inner wall is located in the vicinity of said wing pylon.

3. In a gas turbine engine of the type including a fan and a core engine for driving the fan, a fan nacelle surrounding said fan and a core engine nacelle surrounding said core engine, said fan nacelle and said core engine nacelle cooperating to form an exit passageway for said fan, and an obstruction at or near said fan exit causing a back pressure on said fan, the improvement comprising:

a nacelle provided with an area-rule geometry which provides a relief means at or near the obstruction to yield a flow relief for the obstruction within said fan passageway to thereby substantially eliminate distortion effects on the fan caused by said obstruction.

4. The improvement recited in claim 3 wherein said obstruction comprises an engine control mounted on said core engine downstream of said fan passageway.

5. The improvement recited in claim 3 wherein said obstruction comprises a wing pylon, said pylon including a portion positioned within said fan passageway and extending between said core engine nacelle and said fan nacelle.

6. The improvement recited in claim 5 wherein said fan nacelle is provided with the area-rule geometry.

7. The improvement recited in claim 5 wherein said core engine nacelle includes an area-ruled geometry.

8. The improvement recited in claim 7 wherein the top of said core engine nacelle has less curvature than the bottom of said core engine nacelle.

* * * * *